March 12, 1957 D. R. LIGH 2,785,369
DRIVING ARRANGEMENT AND MOTOR OVERLOAD PROTECTION
Filed Aug. 1, 1951 4 Sheets-Sheet 1

INVENTOR.
David R. Ligh
BY

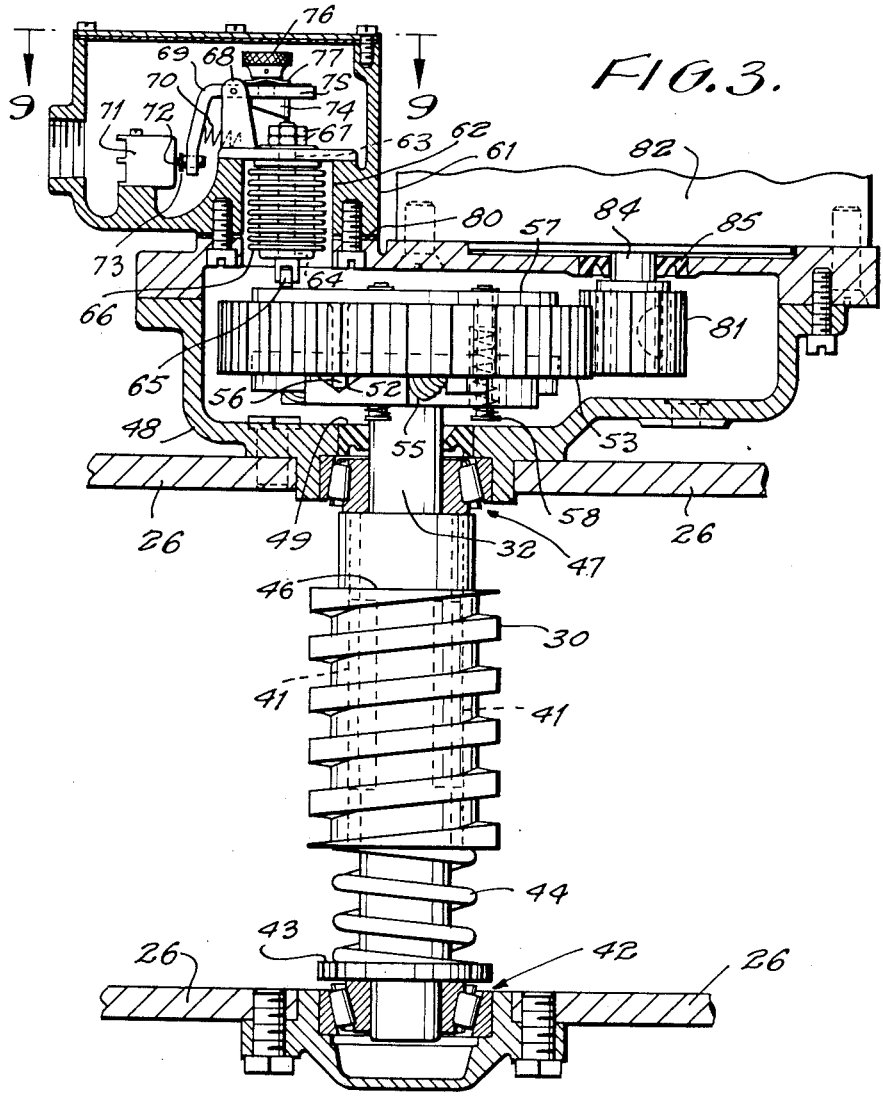
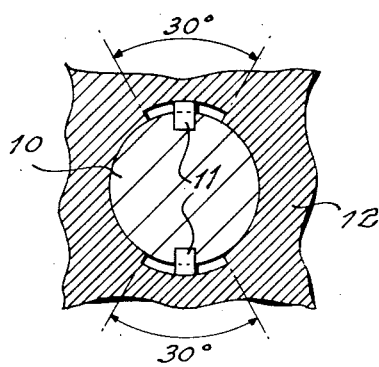
FIG. 3.
FIG. 5.

March 12, 1957     D. R. LIGH     2,785,369
DRIVING ARRANGEMENT AND MOTOR OVERLOAD PROTECTION
Filed Aug. 1, 1951     4 Sheets-Sheet 3
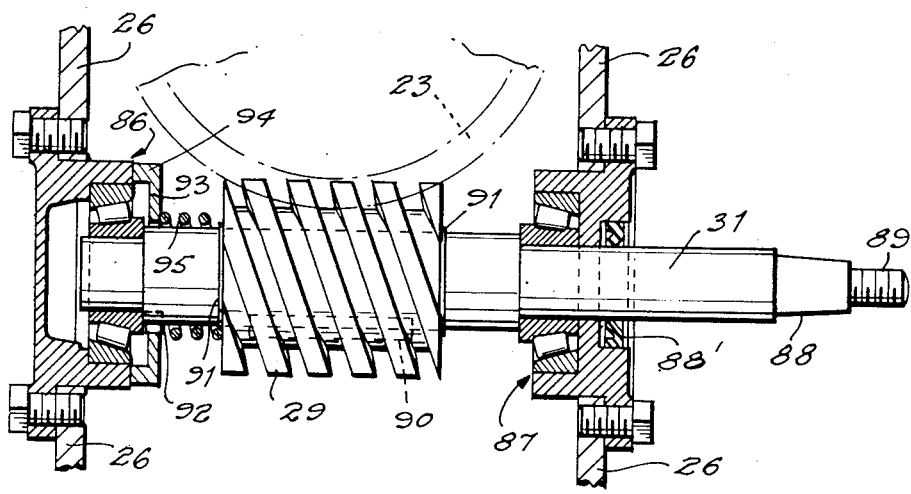
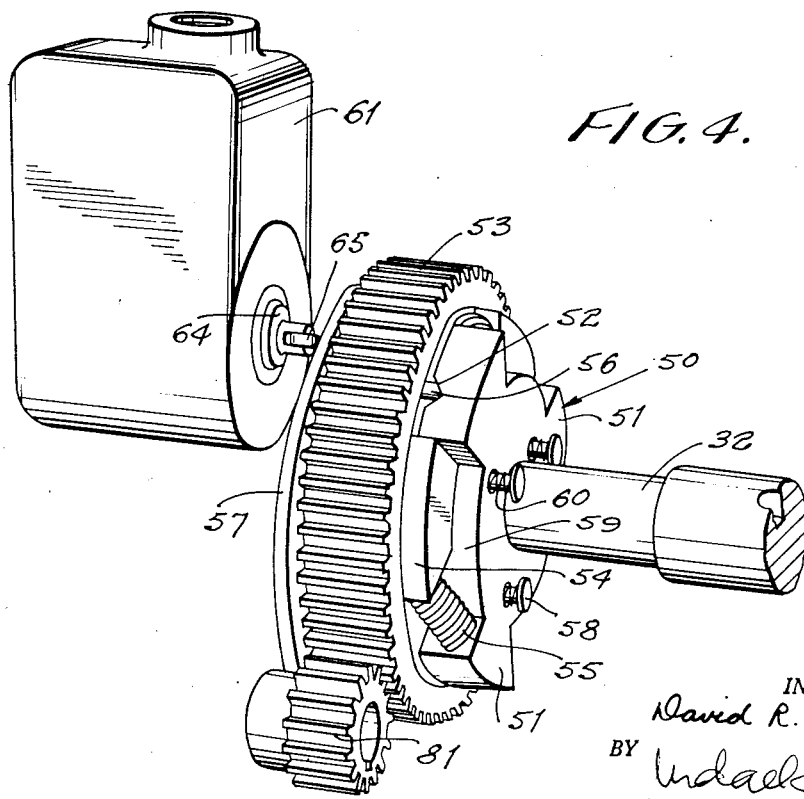
INVENTOR.
David R. Ligh
BY March 12, 1957  D. R. LIGH  2,785,369
DRIVING ARRANGEMENT AND MOTOR OVERLOAD PROTECTION
Filed Aug. 1, 1951  4 Sheets-Sheet 4

INVENTOR.
David R. Ligh
BY

United States Patent Office 2,785,369
Patented Mar. 12, 1957

2,785,369
DRIVING ARRANGEMENT AND MOTOR OVERLOAD PROTECTION

David R. Ligh, New York, N. Y.

Application August 1, 1951, Serial No. 239,685

12 Claims. (Cl. 318—475)

The present invention relates to a driving arrangement which may be mechanically or manually operated.

This case is a continuation-in-part of the U. S. application Serial No. 82,416, filed March 19, 1949 now abandoned.

The device of the present invention is adapted to drive any control device such as for example valves and the like. For example, the device of the present invention is particularly suited for the operation and control of water-tight sliding doors on all types of marine vessels. Such doors are valves in a broad sense.

One of the objects of the present invention is to provide a driving arrangement of the above type which is of a simple, rugged construction and very reliable in operation.

Another object of the present invention is to provide such a driving device which may be operated either manually or mechanically at the option of the operator.

Still another object of the present invention is to incorporate a safety device into the driving arrangement of the present invention to prevent damaging the driving arrangement under great loads.

A further object of the present invention is to incorporate into the driving arrangement a device for absorbing the inertia of the driving motor of the driving arrangement.

A still further object of the present invention is to provide a means for automatically limiting the movement of the driven and controlled part between two desired positions.

Yet another object of the present invention is to incorporate into the device an impact starting mechanism so that the motor of the device will be free to turn before the driving arrangement is set into operation.

An additional object of the present invention is to connect the motor to the rest of the structure of the driving arrangement in such a way that the motor will not be locked with the other structure of the arrangement, so that the motor will always be free to start.

With the above objects in view the present invention mainly consists of a driving arrangement which comprises a driven shaft having connected thereto a transverse shaft which rotates with the driven shaft and is located normal thereto. At least one bevel pinion is mounted on this transverse shaft for free rotation, and a pair of bevel gears are located on opposite sides of the bevel pinion and mesh therewith. These bevel gears are mounted for free rotation on the driven shaft.

A self-locking worm and worm-gear transmission device is connected to one of these bevel gears for rotating the same and a reversible worm and worm-gear transmission device is connected to the other of the bevel gears for rotating the same. The self-locking transmission device is driven by a reversible electric motor, and the reversible transmission device is manually operated. A friction device is connected to the reversible transmission mechanism for preventing reversal thereof and a cushion means is connected to the self-locking transmission device for absorbing the inertia of the reversible motor, when the operation of the self-locking transmission means is terminated. The self-locking transmission device further includes a safety means connected to the reversible motor so as to automatically terminate the operation thereof when a predetermined torque is reached. Between the driven shaft and the reversible motor there is located an impact starting means so that the motor is free to turn through a predetermined number of revolutions before the driving arrangement is driven by the motor, and the extent of rotation of the driven shaft in both directions is limited by a pair of independent limit switches which are connected to the motor for automatically cutting off the power to the same when the desired limits in either direction of rotation of the driven shaft are reached.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a partially sectional plan view of some of the structure of the present invention taken along the line 3—3 of Fig. 2 in the direction of the arrow;

Fig. 4 is a fragmentary isometric view of a part of the structure illustrated in Fig. 3;

Fig. 5 is a sectional view taken along line 5—5 of Fig. 2 in the direction of the arrows;

Fig. 7 is a side elevational view partly in section of the manual operating part of the device taken along line 7—7 of Fig. 2 in the direction of the arrows;

Figure 2:
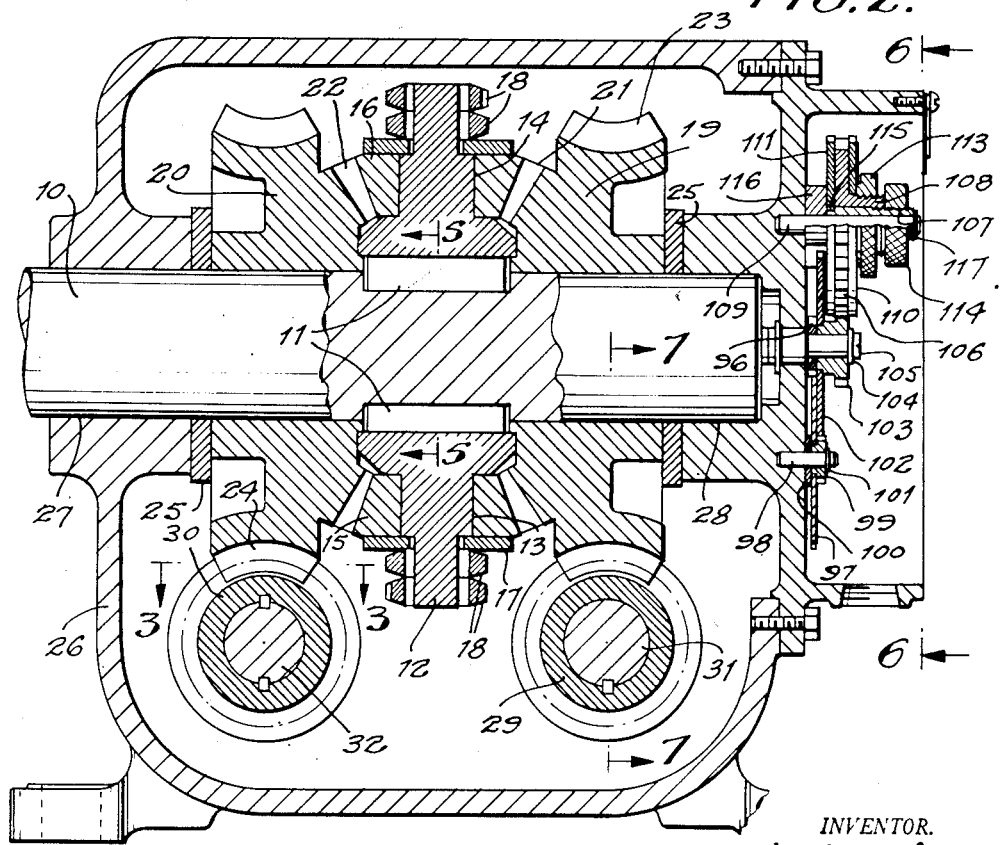
Fig. 2 is a vertical section taken through a central plane of the device and showing the driven shaft partly in section.

Referring first to Fig. 2 of the drawings, there is shown the housing 26 formed with opposite bearings 27 and 28 which support the driven shaft 10. This driven shaft 10 has mounted thereon the spider 12, which is essentially a transverse shaft extending normal to the shaft 10. The shaft 10 has the keys 11 located in recesses formed therein, and these keys 11 engage the spider 12 so that the latter rotates with the shaft 10.

Mounted on opposite end portions of spider 12 are the bevel pinions 15 and 16 which are each held in place by a washer 17 and lock nuts 18. The bevel pinions 15 and 16 are mounted for free rotation on the transverse normal shaft 12, and they mesh with the bevel gears 21 and 22 which are respectively located on opposite sides of the bevel pinions 15 and 16.

Connected to the bevel gears 21 and 22, by being formed integrally therewith for example, are the worm-gears 19 and 20, respectively. Each of bevel gears and connected worm-gears are mounted for free rotation on the shaft 10. The washers 25 are provided for holding the worm and bevel gear units in the proper position meshing with the bevel pinions 15 and 16.

Meshing with the worm-gear 19 is the worm 29 which is mounted on shaft 31 for rotation therewith, and meshing with worm-gear 20 is the worm 30 which is mounted on shaft 32 for rotation therewith. The pitch of the threads of worm 30 is fairly small and the teeth 24 of the worm-gear 20 are not located at a very great angle to the axis of the shaft 10 so that the worm and worm-gear arrangement 30—20 is self-locking, in that the worm-gear 20 may be rotated by rotation of the worm 30, but the worm 30 cannot be rotated by the worm-gear 20.

The threads of the worm 29 on the other hand have a fairly large pitch and the worm 29 may have multiple threads. In the particular example shown, the worm 29 is provided with a double thread, although it may just as well be provided with a triple or quadruple thread, if desired. The worm-gear 19 meshing with worm 29 has its teeth 23 making a fairly large angle with the axis of shaft 10 so that when a large enough force is applied to rotate worm-gear 19, the latter is capable of rotating the worm 29.

The right hand end of shaft 10, as viewed in Fig. 2, has the shaft 40 fixedly connected thereto.

Figure 1:
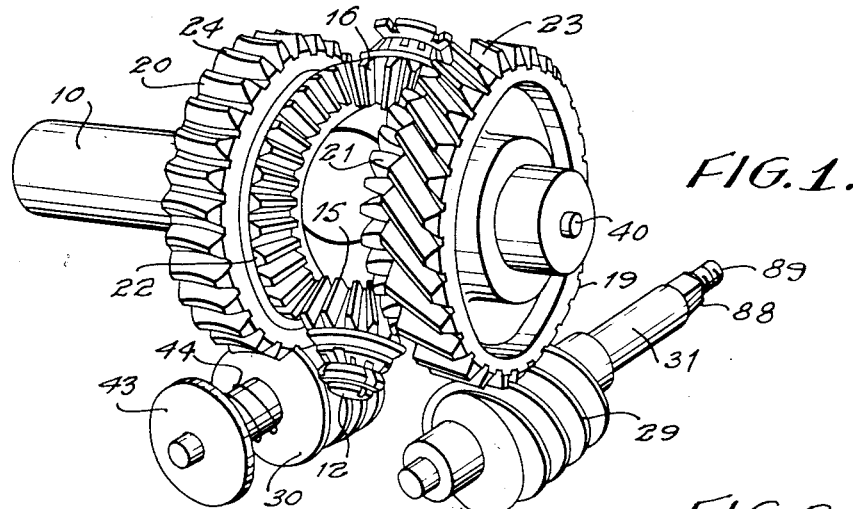
Fig. 1 is a perspective view of the main structure of the device with several of the auxiliary parts thereof omitted.

The above-described structure is illustrated in an isometric view in Fig. 1, so as to clearly illustrate the relationship of the above-described parts.

Referring now to Fig. 3 of the drawings, there is shown the shaft 32, the worm 30 and the structure associated with these parts. The shaft 32 has a pair of keys 41 mounted therein and the keyways formed in the worm 30 extend through the entire length thereof. These keyways of the worm 30 do not make a press fit with keys 41, and the worm 30 is thereby slidably mounted on shaft 32 while being constrained to rotate therewith. The roller bearing device 42 is mounted on the housing 26 and supports for rotation therein one end of the shaft 32. The thrust washer 43 is mounted adjacent to the roller bearing device 42, and the coil spring 44 is located about shaft 32 and bears with one end thereof against the thrust washer 43 and with the other end thereof against the worm 30 so as to urge the worm 30 along the shaft 32 in a direction away from the thrust washer 43. The shaft 32 is formed with a shoulder 46 against which the worm 30 abuts under the action of spring 44 so as to limit the movement of worm 30 in the direction away from thrust washer 43. The opposite end portion of shaft 32 is mounted in the roller bearing device 47 and extends into the housing 48 which is connected to the housing 26.

The housing 48 may be filled with oil, and stuffing box structure 49 is located about shaft 32 to prevent oil in housing 48 from flowing into the housing 26. The structure connected to the shaft 32 and located in housing 48 is shown most clearly in Fig. 4. Referring now to this figure, shaft 32 has fixedly mounted thereon, so as to rotate therewith, the dog device 50 which, in the particular example illustrated, includes three dog members 51 which are equally spaced from each other about the periphery of the device 50. Each of the dogs 51 are formed with a camming surface 52 on the side thereof adjacent to the spur gear 53 which is mounted for free rotation on the end portion of shaft 32. The side of gear 53 which is adjacent to the dog device 50 has three equidistantly spaced dogs 54 connected thereto, as by being formed integrally with the gear 53, and these dogs 54 are each located between two adjacent dogs 51 which are spaced apart from each other by a distance substantially greater than the width of the dogs 54. As is apparent from Fig. 4, each dog 54 has a side thereof located in contact with a side of a dog 51, and the other side of each dog 54 is spaced from a side of a dog 51. Each of these other sides of the dogs 54 and the sides of the dogs 51 which are respectively spaced therefrom are formed with a recess in which an end portion of coil spring 55 is located. It will be seen that there are three such coil springs 55 urging the dogs 54 in one direction of rotation with respect to the dogs 51.

The spur gear 53 is formed with three openings passing therethrough in a direction parallel to the axis of shaft 32, and each of these openings is respectively located opposite the camming surface 52 of each dog 51. Mounted in each of these openings is an elongated pin member 56 which projects at its opposite ends beyond the sides of gear 53.

Located on the opposite side of gear 53 from the dog device 50 is the control plate member 57 which has connected thereto the three pin members 58 extending through openings formed in the dog device 50. The gear 53, as is apparent from Fig. 3, is cut away in the central portion thereof so that it is located about the pins 58, and the gear 53 is mounted for rotation about the axis of shaft 32 by contact between the lower curved faces of dogs 54 with the curved portions 59 of the dog device 50 which are located between the dogs 51 thereof. The pin members 58 are formed with an enlarged end distant from the plate member 57 and the openings in the dog device 50 are formed with shoulders so that individual springs 60 may be mounted about the pins 58 and bear with one end against the enlarged ends of the pins 58 and with their other ends against the shoulder in each opening in the dog device 50, as is clearly illustrated in Fig. 3, so as to urge the control plate 57 toward the gear 53 and dog device 50.

Connected to the other side of housing 48 from housing 26 is the housing 61 which has a recess 62 formed therein on the side thereof facing the control plate 57 and is formed with an opening 63 extending through a wall thereof and aligned with the central axis of recess 62. Mounted for sliding movement in the opening 63 is the elongated operating member 64 which is bifurcated at the end thereof adjacent to plate 57 and which supports roller 65 for rotation in this bifurcated end. A bellows 66 is located about the elongated member 64 so as to permit free movement thereof in the opening 63 while sealing the interior of housing 61 from the oil in housing 48. The bellows 66 is sealably connected at one end to the wall of housing 61 about opening 63 and at the other end is sealably connected to the elongated member 64 adjacent the roller 65. The locknuts 67 are mounted on the elongated member 64 at the end portion thereof located within housing 61 to limit outward movement of elongated member 64 from the housing 61.

Within the housing 61 there is located the double-arm bracket member 68, and between the arms of the bracket member 68 is pivotally supported the bell crank lever 69. Spring 70 bears at one end thereof against the bracket 68 and with the other end thereof against the lever 69 so as to urge this lever in a clockwise direction about its pivotal connection to the arms of bracket 68, as viewed in Fig. 3. The electrical switch device 71 is fixedly mounted in the housing 61 and includes an operating member 72 which is adapted to open and close the switch 71 upon movement of the bell crank lever 69 which has an adjustable screw member 73 for adjusting the connection between lever 69 and operating member 72.

Figure 9:
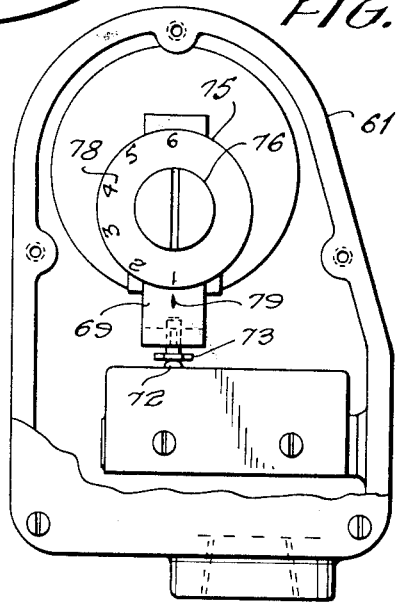
Fig. 9 is a view of part of the structure shown in Fig. 3 taken along line 9—9 of Fig. 3 in the direction of the arrows.

Another adjusting member 74 is located on an end of lever 69 and is rotatably mounted thereon by means of the pin 75 which is connected to the member 74, extends through an opening in lever 69 and is connected to the knob 76. A leaf spring member 77 is located between knob 76 and lever 69 for urging the knob 76 away from lever 69 so as to hold adjustment member 74 against lever 69. The center of rotation of adjustment member 74 is out of line with the axis of elongated member 64, and the member 74 has an end face which is inclined to the axis of elongated member 64 and is located in a plane making an acute angle therewith. Spring 70 maintains this end face of adjustment member 74 in contact with the elongated member 64. The knob 76 has indicia 78 thereon which cooperates with indicia 79 on lever 69, as is clearly shown in Fig. 9, so that the position of adjustment member 74 may be properly regulated.

The gasket 80 may be located between the housing 61 and housing 48 to prevent leakage of oil from between these housings.

As is shown in Figs. 3 and 4, the pinion 81 meshes with the gear 53 and is connected to the reversible electric motor 82 for rotation therewith. Thus, when the motor 82 is driven it rotates the pinion 81 to rotate the gear 53. Located about the shaft 84 of motor 82, on which shaft the pinion 81 is fixedly mounted, is the stuffing box structure 85 for preventing leakage of oil from the housing 48.

The details of the connection between the spider 12 and shaft 10 is illustrated in Fig. 5 from which it is seen that the keys 11, mounted in the shaft 10, engage enlarged keyways formed in the spider 12. These enlarged keyways may each extend over an angle of 30°, for example, and the gearing from the motor 82 up to the spider 12 is such that the motor 82, when it is started, may turn through several revolutions before one of the sides of each of the keyways formed in the spider 12 contact the keys 11 to rotate shaft 10. Thus, this interconnection of the shafts 10 and 12 forms an impact starting device which permits the motor to freely move all of the parts connected thereto up to the shaft 10 before the latter is rotated by the motor.

Referring now to Fig. 7 of the drawings, there are shown therein the details of the structure associated with the worm 29 and shaft 31. The left end of shaft 31, as viewed in Fig. 7, is rotatably supported by means of the roller bearing device 86 which is connected to the housing 26. The opposite end portion of the shaft 31 is rotatably supported by the roller bearing device 87 which is connected to the housing 26. The shaft 31 extends through the bearing 87, and stuffing box 88 may be located about the shaft 31 to prevent dust and foreign matter from entering the housing 26.

The outer end portion of shaft 31 which is located beyond the roller bearing device 87 has a reduced part 88 of non-circular cross-section for receiving a hand wheel or crank, so that the shaft 31 may be manually rotated. The extreme outer end 89 of shaft 31 is threaded for holding such a crank or hand wheel on the non-circular portion 88 of shaft 31.

The worm 29 is constrained to rotate with the shaft 31 by means of the key 90 which interconnects these parts, and the worm 29 is held in place on the shaft 31 by means of split rings 91, for example, which abut against the end faces of the worm 29 and are located in annular grooves of shaft 31.

The shaft 31, adjacent to the bearing device 86, is formed with a keyway in which is located the key 92, and located about the shaft 31 is a friction plate 93 which has an annular flange 94 bearing against a stationary part of bearing device 86. Located about shaft 31 between plate 93 and worm 29 is the coil spring 95 which bears with its opposite ends against the plate 93 and worm 29, respectively. The friction plate 93 may move slidably along the shaft 31 and is only constrained to rotate therewith by key 92.

As is apparent from Fig. 2, there is fixedly connected to the right hand end of shaft 10, as viewed in Fig. 2, the shaft 40. Fixedly connected to the shaft 40 for rotation therewith is the gear 96 which meshes with the gear 97 which is rotatably mounted on the stationary shaft 98. The gear 97 has a pinion 99 fixedly connected thereto for rotation therewith about the shaft 98, and the gears 97 and 99 may be properly located on the shaft 98 by means of the washer 100 and split ring 101 located in an annular groove of the shaft 98. Pinion 99 meshes with gear 102 rotatably mounted on shaft 40 and having fixedly connected thereto, for rotation therewith, the pinion 103 which also is rotatably mounted on the shaft 40. Gears 102 and 103 are held in position on the shaft 40 by means of the end plate member 104, for example, which is mounted on the end of shaft 40 by the screw 105.

Pinion 103 meshes with the gear 106 which is slidably mounted on the elongated tubular member 107 and which has an elongated threaded tubular extension 108 extending from one side thereof and also located on the elongated tubular member 107. This elongated tubular member 107 also has a threaded portion at one end thereof and is mounted for free rotation on the stationary shaft 109. The circular cam plate 110 is mounted on one side of gear 106 and the circular cam plate 111 is mounted on the other side thereof. These cams 110 and 111 are of substantially the same construction, and cam 110 is shown in Fig. 6.

Cam 110 is located directly over cam 111. The cams 110 and 111 are constituted by cut-out portions respectively located in the peripheries thereof, and Fig. 6 clearly shows the cut-out portion 112 of cam 110. The cam 111 has a cut-out portion similar to cam 112. The two cut-out portions of the cams 110 and 111 may be located in any desired position with respect to each other through the medium of the nuts 113 and 114.

The nut 113 engages the threads on the outer side of the tubular extension 108, so that nut 113 may clampingly press the cam 110 to one side of gear 106. The nut 114 engages the threads on the outer side of the tubular member 107, and this tubular member has an annular flange 115 at the end thereof opposite to its threaded end. This annular flange 115 extends outwardly from tubular member 107 and engages the side of cam 111 distant from the gear 106, so that the cam 111 may be adjusted to any desired position by loosening the nut 114 and tightening the same. The nut 114 bears against the outer end of tubular extension 108, so that when nut 114 is loosened, the tubular extension 108 and gear 106 only loosely bear against the cam 111, and the latter then may be rotated to any desired position. When the nut 114 is tightened it pushes the extension 108 and gear 106 against the cam 111 and tightly clamps the latter between the flange 115 and gear 106. This arrangement permits independent adjustment of the cams 110 and 111. The tubular member 107 is properly located on the shaft 109 by means of the washer 116 at one end thereof and at the other end thereof by means of the split ring 117 which is located in an annular groove in the shaft 109.

Figure 6:
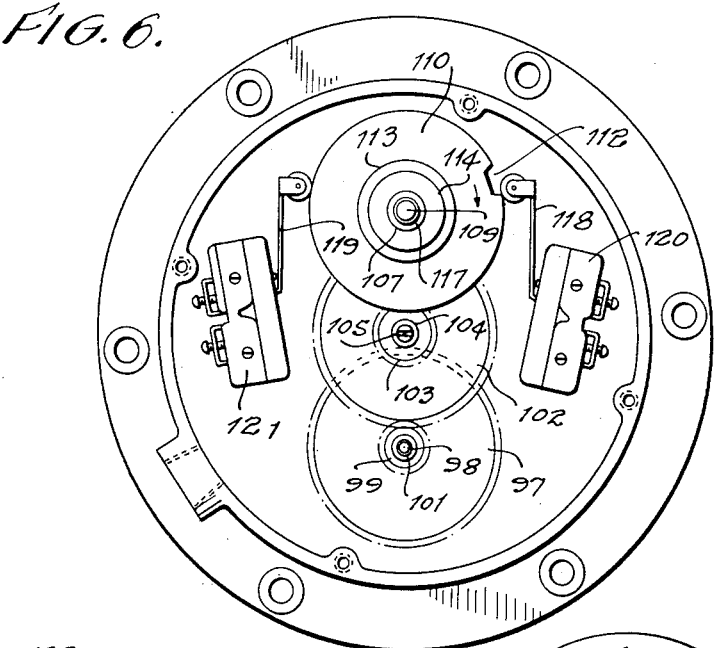
Fig. 6 is a side elevational view of the limit switch structure of the present invention taken along line 6—6 of Fig. 2 in the direction of the arrows.

As is apparent from Fig. 6, the cams 110 and 111 respectively cooperate with the arms 118 and 119 of the switch devices 120 and 121 which are connected to the motor 82 for controlling the rotation thereof in opposite directions. The arms 118 and 119 respectively support rollers which engage the peripheries of the cams 110 and 111, respectively. These arms are resiliently urged by the switch devices toward the cams 110 and 111, so that the rollers on these arms will enter the cut-outs in the cams, and, when the rollers enter the cut-outs, the switch associated with the particular arm 118 or 119 is opened and the supply of power to the motor 82 is terminated. For example, when the cam 110 is rotated sufficiently for the roller of arm 118 to be located in cut-out portion 112, the switch 120 will be opened, whereas when this switch is closed, the roller of arm 118 is located out of cut-out portion 112.

Figure 8:
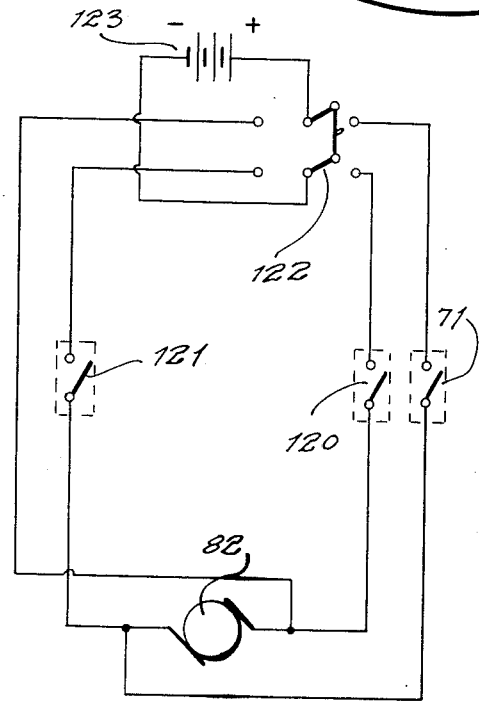
Fig. 8 is a schematic wiring diagram of the device of the present invention.

The electrical wiring of the device is schematically illustrated in Fig. 8 where there is shown the double pole switch 122 which connects the source of current 123 with the lines passing to the switches 121, 120 and 71 and to the motor 82. In Fig. 8 only the armature of the motor is schematically shown, the field windings having been omitted, and it is apparent that the current from source 123 will flow in opposite direction through the armature of motor 82 depending upon which way the double pole switch 122 is moved into either of its closing positions, so that in this way the motor 82 is rendered reversible.

The driven shaft 10 of the above-described structure may be connected by any suitable gearing, for example, to the movable member of a valve or other operating part of any mechanism for moving the same between two predetermined end positions. Considering the watertight sliding door of a marine vessel as the part to be operated by the shaft 10, the latter may be connected by gearing to such a door so as to move it between predetermined open and closed positions. The above-described structure is intended to be used with a device where the movement of the controlled member, such as a watertight sliding door, is fairly easily in one direction, but may be fairly difficult in the opposite direction either because the controlled member moves against the flow of a fluid, for example, or is likely to encounter obstructions. Thus, in one direction of movement the above-described device is intended to automatically stop its operation in the event of obstruction so as to prevent damaging of the device, while such a safety means would not be required in the opposite direction of movement because of the very small possibility of such obstructions. However, as will be pointed out more fully below, the device may easily be adapted for automatic termination of operation in both directions of movement.

Referring to Figs. 3 and 4 of the drawings, when the switch 122 (Fig. 8) is moved to the right into closed position, as viewed in Fig. 8, and assuming that switches 120 and 71 are closed at this time, the operation of the device is as follows:

The cams 110 and 111 are out of phase with each other, that is, their cut-outs are not aligned, so that at this moment when the switch 122 is moved into the above-mentioned closing position, the switch 121 is open and the switch 120 is closed. The switch 121 is opened due to the fact that the operation of the device terminated when the roller of arm 110 entered the cut-out portion of cam 111. This terminated the operation of the device in one direction, and the switch 122 is now closed, as described above, to enable the arrangement to be moved in the opposite direction.

The said closing of switch 122 causes the motor to rotate, and at this time the motor rotates the pinion 81 and gear 53 so as to move the latter in a counterclockwise direction, as viewed in Fig. 4, that is, the left side of the gear 53, as viewed in Fig. 4, is moving in a downward direction. The rotation of the motor and gears 81 and 53 in this direction causes the torque of the motor to compress springs 55, since dogs 54 move with gear 53 to which they are fixedly connected. Through the medium of these springs 55 which engage the dogs 51, the dog device 50 is rotated and the shaft 32 fixedly connected to the dog device 50 is rotated therewith. This causes rotation of the worm 30 which engages the teeth 24 of worm gear 20 so as to rotate the latter about the shaft 10 and so as to rotate the bevel gear 22 therewith. This rotation of bevel gear 22 causes the bevel pinions 15 and 16 to rotate on spider 12 and causes the latter to rotate because the bevel gear 21 and worm gear 19 are held stationary due to their engagement with the worm 29. Thus the motor turns and drives the above-mentioned parts freely until the enlarged keyways of spider 12, as shown in Fig. 5, engage the keys 11 and thereby cause the shaft 10 to rotate in one direction and to move the device to which it is connected.

As was mentioned above, the worm 29 may be double threaded and has threads of a relatively large pitch, and it may be possible for the motor to rotate the gears 15 and 16 so as to rotate the bevel gear 21 and worm-gear 19 and thereby set the worm 29 into operation. The large pitch and double threading of the worm 29 is considered desirable so that, when the device is manually operated, a minimum number of rotations of the worm 29 will be required to rotate the shaft 10 through a large number of rotations. However, it is evident that when the device is mechanically operated it will be undesirable to have the motor turn the bevel gear 21 and worm-gear 19 instead of the shaft 10. The critical angle of the pitch of the threads of the worm 29 which will render it reversible or self-locking is dependent upon the force which tends to turn the worm-gear 19. With a relatively large force, this worm-gear would undoubtably turn, and the worm 29 would rotate rather than the shaft 10. In order to avoid this undesired result, while at the same time maintaining the advantage of the speedy operation of the shaft 10 by means of manual rotation of worm 29, the friction device shown in Fig. 7 is provided, and the force of spring 95 is so chosen that the friction of plate 94 bearing against the stationary part of bearing 86 will be added to whatever force is required to turn the worm-gear 19. The total of these two forces is designed to be larger than the force of the motor 82 tending to turn the gear 19 and rotate the worm 29, so that the manually operated worm and worm-gear transmission is rendered self-locking by this friction device.

Thus when it is desired to manually operate this device, the shaft 31 is manually rotated and the plate 93 frictionally slides against the stationary part of bearing means 86. The pitch of worm 30 and worm-gear 20 are relatively small so that they are self-locking, and the shaft 10 may thereby be rotated by the manual transmission means. However, when the motor 10 operates the mechanical transmission means, it must overcome the force of friction between plate 94 and the stationary part of bearing 86 as well as the friction between the worm-gear 19 and worm 29, and since the force of spring 95 is chosen at a great enough value to prevent the motor 82 from overcoming these combined forces, the manual transmission means is rendered self-locking by the friction device and the rotation of the shaft 10 is assured. It is thus apparent that the force of spring 95 must be carefully chosen with respect to the force of motor 82 and the remaining parts of the device so as to produce the desired results.

The above-described free rotation of the spider 12 by the motor 82 until the keys 11 on shaft 10 are contacted by the enlarged keyways in the spider 12 constitute an impact starter arrangement which permits the motor to turn through several revolutions before it commences to drive the shaft 10. It should also be noted that the springs 55 separate the motor from the worm 30 and gearing associated therewith so that the motor is never locked with this latter structure and is always free to start independently of the same.

When the motor commences to rotate, as described above, the dogs 54 will move with respect to the dogs 51 and compress the springs 55. In this way the gear 53 also will move with respect to the dogs 51 and the pins 56 are thereby respectively moved laterally of the camming surfaces 52 of dogs 51, so that these camming surfaces move the pins through the apertures in the gear 53 and cause these pins to push the control plate 57 against the action of springs 60 away from the gear 53 and toward the housing 61. This movement causes the elongated member 64 to move against the action of spring 70 and thereby turn the bell crank 69 in a counterclockwise direction, as viewed in Fig. 3. When the bell crank 69 is moved a sufficient distance in this manner, the control member 72 of switch 71 will be moved sufficiently to open this switch and cut off the power supply to the motor 82, as is apparent from Fig. 8. The parts are so designed that the pins 52 will not move the control plate 57 sufficiently to open switch 71 under ordinary load conditions. However, when a particularly great torque is produced, as by an obstruction in the path of a sliding water-tight door driven by shaft 10, the gear 53 will be moved to a greater extent with respect to the dogs 51 than under ordinary load conditions, and the camming surfaces 52 will move the pins 56 to push the control plate 57 a further distance than under ordinary load conditions so as to open the switch 71.

The particular point at which the switch 71 will be opened may be controlled by the position of the adjustment member 74. Due to the fact that the inclined end face of adjustment member 74 has its center of rotation out of line with the axis of elongated member 64, the bell crank lever 69 may be located at a desired position so that more or less movement of the same will be required to open the switch 71. Thus the adjustment member 74 permits the lever 69 to be set so as to open switch 71 when a predetermined torque is reached. As may be seen from Fig. 9, the knob 76 has various numbers thereon which constitute the indicia 78, and this indicia 78 cooperates with the reference mark 79 on the bell crank 69 so that the operator may set the knob and adjustment member connected thereto at a desired position to cut off the power of the motor 82 when a predetermined torque is reached.

Assuming that the motor 82 stops rotating, due to the opening of switch 71 under overload conditions, the inertia of the armature thereof will cause the motor shaft 84 to continue to rotate, and if the worm 30 were fixedly mounted on the shaft 32 and the gearing connected to worm 30 could not turn anymore, because the element moved by shaft 10 engaged an obstruction, for example, the result would be that the worm 30 would creep along the worm-gear 20 and become frictionally locked thereto. In this latter connection, it should be noted that such frictional binding, if it did occur, would in no way affect the motor 82 because the latter is separated from the worm 32 by means of the springs 55, as was described above, and the motor therefore cannot become locked with the remainder of the driving arrangement. However, the above creeping of the worm 30 due to the inertia of the motor is prevented from causing an increase in the frictional contact between the worm 30 and worm-gear 20 by the above-described slidable mounting of the worm 30 on the shaft 32. Thus when the power to the motor is cut off by switch 71, the intertia of the motor will continue to rotate the shaft 32 and will cause the worm 30 to slide along the shaft due to the fact that the worm gear 20 is stationary. This inertia energy of the motor which causes the worm 30 to slide along the shaft 32 is absorbed by the spring 44, and it is apparent that the force of this spring must be carefully chosen with respect to the force of springs 55 so as to produce the desired cushion effect.

The combined force of springs 55 must be less than the force of spring 44, when the driving arrangement is stationary. When the springs 55 are compressed under overload conditions to a sufficient extent to cause opening of the torque switch 71, the force of the springs 55 will be greater than under ordinary load conditions due to the greater compression thereof, and will equal and surpass the force of spring 44, and the additional inertia of the motor will be absorbed and cushioned by the turning of the shaft 32 and the sliding movement of the worm 30 along shaft 32 compressing the spring 44. It can readily be appreciated that by causing the energy of the motor to be absorbed by the spring 44, a relatively great amount of inertia can be absorbed due to the fact that the spring 44 will only be compressed a slight distance during a revolution of the motor 82. The springs 55 would very greatly be compressed by a slight rotation of the motor 82 if the above cushioning structure were not provided, assuming that a very great force were preventing the dogs 51 from turning, which would be the case under extreme overload conditions. It is thus apparent that were it not for the slidable mounting of worm 32 and spring 44, the springs 55 would be very greatly compressed at overload conditions since they would necessarily absorb the greatest part of the motor under these conditions, and the worm 30 would dig into the teeth 24 of worm-gear 20, whereas all of this is prevented by the slidable mounting of worm 30 and by spring 44 which absorbs the inertia of the motor after the springs 55 have been compressed to a predetermined extent.

Thus the interrelation of all of the above-discussed parts of the device is evident. The size and force of springs 55 must be carefully chosen and properly related to the force of spring 44, taking into consideration the sizes of the intermediate connecting parts of the device, in order to produce the desired results. Also, as was mentioned above, the spring 95 must be carefully chosen taking into consideration the sizes and relationship of the parts associated therewith to prevent reversal of the manually operated worm and worm-gear transmission due to any force which the motor 82 could exert. Since the motor operates through springs 55, the latter must be carefully considered in determining the size and force of spring 95.

The limit switch structure, described above and illustrated in Figs. 2 and 6, permits the shaft 10 to turn in opposite directions to a predetermined extent. One of the limit switches turns off the energy flowing through the motor 82 when the shaft 10 is rotating in one direction, and the other limit switch cuts off the power of motor 82 when the shaft 10 is rotating in the opposite direction. From the wiring diagram illustrated in Fig. 8, it will be seen that the limit switch 120 is located in the circuit of the motor 82 when it rotates in one direction and the limit switch 121 is located in the circuit of the motor 82 when it is rotating in the opposite direction.

To set the limit switches, the shaft 10 is rotated manually for example, till the controlled element is located in one of the desired end positions of its movement. At this point, assuming that the switch 120 is connected in the circuit of the motor when it rotates in the proper direction for moving the shaft 10 so as to move the controlled element to this position, the nut 113 is loosened and the cam 110 is turned so that the roller of arm 118 will be located in the cut-out portion 112, and then the nut 113 is tightened so as to fix the cam in this position. Thus when the motor is turned so as to move the controlled element to the said position, the shaft 10 will turn through the necessary revolutions, while the cam 110 has not yet turned through a single revolution as a result of the gearing 96—97, 99—102, and 103—105, until the roller of arm 118 engages cut-out 112 and the switch 120 becomes open so that the motor 82 stops, the driven shaft 10 stops rotating, and the controlled element is located at the desired position.

The motor may then be rotated in the reverse direction to move the controlled element back to another end position opposite to the above-described position, and the cam 111 may be adjusted in the same way as the cam 110 in order to cause limit switch 121 to open at the proper time. This is done simply by loosening the nut 114 so as to free the cam 111, which then may be located with its cut-out portion engaging the roller of arm 119 when the controlled element is located in the said opposite end position. Thus each of the cams 110 and 111 may be independently set to regulate the device so that it accurately moves a controlled part to two opposite end positions.

It is apparent that the cut-out portions of the two cams will never be in line with each other, since this position would be the end limit of movement for which the particular size of the parts were suited. In other words, for the particular size of the structure chosen, the shaft 10 can only turn through a number of revolutions which is slightly under the number of revolutions of shaft 10 required for a complete revolution of cams 110 and 111 to take place. These cams merely reciprocate back and forth during the operation of the device and never turn through a complete revolution. If it should be found that it is necessary to move a controlled part for a greater distance than is produced by the number of rotations of shaft 10 required for one revolution of cams 110 and 111, the situation may be remedied by altering the gearing between shaft 10 and the controlled element rather than by substituting an entirely new driving arrangement of different dimensions. It is thus apparent that switches 120 and 121 are never simultaneously opened although they are closed simultaneously, but this latter fact makes no difference since one of the closed switches is in a circuit which is not connected to the motor.

Thus, assuming that the switch 122 has been moved to the right as viewed in Fig. 8 and that switches 120 and 71 are closed, the motor 82 will rotate in a given direction to rotate shaft 10 and cause the latter to move the element connected thereto. When the end of this movement is reached, the cam 110 automatically causes the switch 120 to become opened and automatically stops the motor 82. Switch 71 remains closed except when extreme overload conditions arise. Although switch 121 is opened when the above-described operation has commenced, the simultaneous rotation of the cams 110 and 111 causes the roller of arm 119 to move out of the cut-out of cam 111 and close the switch 121, so that when the switch 120 is automatically opened, as described above, the switch 121 is already closed and the driving arrangement may be rotated in the opposite direction simply by moving switch 122 to the left closed position, as viewed in Fig. 8. The motor 82 will rotate in the reverse direction and move the controlled element in the reverse direction until the switch 121 is automatically opened by the cam 111, and at this time the switch 120 will have already been closed so that the above cycle can be repeated again.

The torque switch 71 is shown located in only one of the circuits of the motor because in the particular example undue overloads would be likely to occur only in one direction of the rotation of the shaft 10. However, it is obviously a simple matter to interconnect the torque switch 71 with the motor circuit so as to cut off power to the motor in both directions of rotation thereof under overload conditions, if such overload conditions are likely to occur in both directions of rotation; and it obviously is also a simple matter to provide additional springs similar to springs 55 between the contacting side faces of the dogs 51 and 54 so that the torque switch could be operated under overload conditions in either direction. The symmetrical camming surface 52 would obviously actuate the pins 56 irrespective of the direction in which the gear 53 turned with respect to the dogs 51.

It is believed apparent that the above-described structure provides a driving arrangement which is particularly rugged and simple in operation and capable of accurately moving an element between two opposite end conditions. This may be done automatically by the motor, or it may be done manually by means of a manually rotatable shaft 31. The large pitch of the manual transmission means permits the controlled part to be moved rapidly with a minimum number of rotations of the shaft 31, and the above-described friction device prevents reversal of the manual transmission device by the motor. The above description is believed to clearly indicate that all of the parts of the device must be carefully designed and chosen so that they have the proper interrelation with respect to each other and cooperate to produce the desired results.

It will be understood that each of the elements described above, or two or more together, may also find a useful application in other types of driving arrangements differing from the types described above.

While the invention has been illustrated and described as embodied in a mechanically or manually operable driving arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A driving arrangement, comprising in combination, a rotatably mounted driven shaft; a transverse shaft mounted on said driven shaft for rotation therewith and extending normal to said driven shaft; at least one bevel pinion supported for free rotation on said transverse shaft; two bevel gears respectively located on opposite sides of said bevel pinion and being in mesh with the same, said bevel gears being mounted for free rotation on said driven shaft; first self-locking worm and worm-gear transmission means operatively connected to one of said bevel gears for rotating the same; reversible second worm and worm-gear transmission means operatively connected to the other of said bevel gears for rotating the same; friction means operatively connected to the worm of said second transmission means; reversible motor means operatively connected to the worm of said first transmission means for rotating the same; and manually rotatable shaft means operatively connected to the worm of said second transmission means for rotating the same.

2. A driving arrangement, comprising in combination, a rotatably mounted driven shaft; a transverse shaft mounted on said driven shaft for rotation therewith and extending normal to said driven shaft; at least one bevel pinion supported for free rotation on said transverse shaft; two bevel gears respectively located on opposite sides of said bevel pinion and being in mesh with the same, said bevel gears being mounted for free rotation on said driven shaft; first self-locking worm and worm-gear transmission means operatively connected to one of said bevel gears for rotating the same; reversible second worm and worm-gear transmission means operatively connected to the other of said bevel gears for rotating the same; a friction means operatively connected to the worm of said second transmission means; reversible motor means operatively connected to the worm of said first transmission means for rotating the same; and manually rotatable shaft means operatively connected to the worm of said second transmission means for rotating the same, said friction means of said second transmission means comprising a plate member mounted on said manually rotatable shaft only for sliding movement therealong, a stationary member bearing against said plate member and pressure means operatively connected to said plate member for urging the same against said stationary member.

3. A driving arrangement, comprising in combination, a rotatably mounted driven shaft; a transverse shaft mounted on said driven shaft for rotation therewith and extending normal to said driven shaft; at least one bevel pinion supported for free rotation on said transverse shaft; two bevel gears respectively located on opposite sides of said bevel pinion and being in mesh with the same, said bevel gears being mounted for free rotation on said driven shaft; first self-locking worm and worm-gear transmission means operatively connected to one of said bevel gears for rotating the same; reversible second worm and worm-gear transmission means operatively connected to the other of said bevel gears for rotating the same; reversible motor means operatively connected to the worm of said first transmission means for rotating the same; friction means operatively connected to the worm of said second transmission means; cushion means operatively connected to said first transmission means for absorbing the inertia of said motor means; and manually rotatable shaft means operatively connected to the worm of said second transmission means for rotating the same.

4. A driving arrangement, comprising in combination a rotatably mounted driven shaft; a transverse shaft mounted on said driven shaft for rotation therewith and extending normal to said driven shaft; at least one bevel pinion supported for free rotation on said transverse shaft; two bevel gears respectively located on opposite sides of said bevel pinion and being in mesh with the same, said bevel gears being mounted for free rotation on said driven shaft; first self-locking worm and worm-gear transmission means operatively connected to one of said bevel gears for rotating the same, the worm of said first transmission means being mounted for sliding movement along its axis; reversible second worm and worm-gear transmission means operatively connected to the other of said bevel gears for rotating the same; friction means operatively connected to the worm of said second transmission means; reversible motor means operatively connected to the worm of said first transmission means for rotating the same; cushion means operatively connected to said first transmission means for absorbing the inertia of said motor means, said cushion means comprising a pressure device operatively connected to and bearing against the worm of said first transmission means so that said pressure device will be compressed by the sliding movement of said last-mentioned worm to absorb the inertia of said motor means when said first transmission means stops operating; and manually rotatable shaft means operatively connected to the worm of said second transmission means for rotating the same.

5. A driving arrangement, comprising in combination, a rotatably mounted driven shaft; a transverse shaft mounted on said driven shaft for rotation therewith and extending normal to said driven shaft; at least one bevel pinion supported for free rotation on said transverse shaft; two bevel gears respectively located on opposite sides of said bevel pinion and being in mesh with the same, said bevel gears being mounted for free rotation on said driven shaft; first self-locking worm and worm-gear transmission means operatively connected to one of said bevel gears for rotating the same; second worm and worm-gear transmission means operatively connected to the other of said bevel gears for rotating the same, the worm of said second transmission means having threads of a pitch large enough to make said last-mentioned worm rotatable by rotation of the worm-gear of said second transmission means when said last-mentioned worm-gear is rotated with a great enough force; reversible motor means operatively connected to the worm of said first transmission means for rotating the same; manually rotatable shaft means operatively connected to the worm of said second transmission means for rotating the same; and impact starter means located between said motor means and driven shaft for permitting said motor means to operate before said driven shaft is rotated.

6. A driving arrangement, comprising in combination, a rotatably mounted driven shaft; a transverse shaft mounted on said driven shaft for rotation therewith and extending normal to said driven shaft; at least one bevel pinion supported for free rotation on said transverse shaft; two bevel gears respectively located on opposite sides of said bevel pinion and being in mesh with the same, said bevel gears being mounted for free rotation on said driven shaft; first self-locking worm and worm-gear transmission means operatively connected to one of said bevel gears for rotating the same; second worm and worm-gear transmission means operatively connected to the other of said bevel gears for rotating the same, the worm of said second transmission means having threads of a pitch large enough to make said last-mentioned worm rotatable by rotation of the worm-gear of said second transmission means when said last-mentioned worm-gear is rotated with a great enough force; reversible motor means operatively connected to the worm of said first transmission means for rotating the same; manually rotatable shaft means operatively connected to the worm of said second transmission means for rotating the same; and impact starter means located between said motor means and driven shaft for permitting said motor means to operate before said driven shaft is rotated, said impact starter means comprising at least one key mounted between said driven shaft and transverse shaft and being fixedly connected to one of said shafts for rotation therewith, the other of said shafts being formed with a recess in which said key is located, said recess having opposite side faces spaced apart by a distance greater than the width of said key so that said other shaft will freely rotate until one of said side faces of said recess contacts said key.

7. In a driving arrangement, in combination, a reversible worm and worm-gear transmission, the worm of said transmission being mounted on a shaft for rotation therewith; and friction means operatively connected to said worm, said friction means including a plate member mounted on said shaft only for sliding movement therealong, a stationary member located against said plate member, and resilient means mounted between said worm and said plate member for urging the latter away from said worm and towards said stationary member, whereby, when said shaft is rotated, said plate member rotates therewith and frictionally bears against said stationary member.

8. An electrical switch, comprising in combination, a housing formed with at least one opening passing through the wall thereof; an elongated control member slidably mounted in said opening for axial movement in the same; a bellows located on the outside of said housing and on said control member for sealing the interior of said housing from the exterior thereof while permitting said control member to move in said opening; an operating lever located in said housing for opening and closing the switch and being pivotally mounted intermediate the ends thereof; pressure means operatively connected to said lever adjacent one end thereof for urging the other end thereof toward said control member; an adjustment member mounted for rotation on said other end of said lever and being located between said lever and said control member, said adjustment member having an end surface located in engagement with said control member and being located in a plane making an acute angle with the axis of said control member, the center of rotation of said adjustment member being spaced from the axis of said control member, whereby the extent of movement of said control member which is required to open said switch by movement of said operating lever through the medium of said adjustment member may be regulated by the position of said adjustment member; a knob fixedly connected to said adjustment member for rotation therewith; and indicia located on said knob and said lever for indicating the position of said adjustment member.

9. A driving arrangement, comprising in combination, a rotatably mounted driven shaft; a reversible electric motor operatively connected to said shaft for rotating the same; a first switch located in the circuit of said motor for controlling the rotation thereof in one direction; a second switch located in the circuit of said motor for controlling the rotation thereof in a direction opposite to said one direction; a first rotatably mounted cam operatively connected to said first switch for operating the same; a second rotatably mounted cam of substantially the same construction as said first cam operatively connected to said second switch for operating the same and being located coaxially with said first cam, said cams being out of phase with each other so that when one of said switches is open the other of said switches is closed; and transmission means common to said cams and operatively connected to said driven shaft for turning said cams in response to rotation of said driven shaft, whereby said shaft may be rotated in opposite direction only until said switches are respectively opened by said cams, said transmission means comprising a stationary shaft, a gear located between said cams and about said shaft, said gear having a tubular extension also located about said shaft and extending from one side of said gear and through one of said cams, said extension being threaded on the outer side thereof, a first nut threadedly mounted on said extension for clamping said one cam to said gear at a desired position with respect thereto, an elongated tubular member having an outwardly extending annular flange at one end thereof, being located on said stationary shaft for free rotation thereon and extending through the other of said cams, said gear and said tubular extension, said tubular member being threaded at the end portion opposite said one end thereof and having the annular flange thereof located against said other cam, and a second nut threadedly engaging said opposite end portion of said tubular member and bearing against an end of said tubular extension so as to clampingly engage said other cam against said gear so that said other cam may be located at a desired position with respect to said one cam.

10. A driving arrangement, comprising in combination, a driven shaft; a transverse shaft connected to said driven shaft for rotation therewith and being normal thereto; a bevel pinion mounted on said transverse shaft for free rotation thereon; a pair of bevel gears located on opposite sides of said bevel pinion and meshing therewith, said bevel gears being mounted for free rotation on said driven shaft; self-locking worm and worm-gear transmission means operatively connected to one of said bevel gears for rotating the same; reversible worm and worm-gear transmission means operatively connected to the other of said bevel gears for rotating the same; electrical reversible motor means operatively connected to said self-locking transmission means for driving the same; manually operable shaft means operatively connected to said reversible transmission means for operating the same; friction means operatively connected to said reversible transmission means for increasing the force required for reversal thereof; cushion means operatively connected to self-locking transmission means for absorbing the inertia of said motor means when the operation of said self-locking transmission means is terminated; safety means operatively connected to said motor means for automatically terminating the operation thereof when a predetermined torque is reached; impact starter means located between said driven shaft and motor means for permitting the latter to rotate before said driven shaft is rotated; and limit switch means operatively connected to said motor for limiting the rotation of said driven shaft in both directions by said motor means.

11. A driving arrangement, comprising in combination, a driven shaft; a transverse shaft connected to said driven shaft for rotation therewith and being normal thereto; a bevel pinion mounted on said transverse shaft for free rotation thereon; a pair of bevel gears located on opposite sides of said bevel pinion and meshing therewith, said bevel gears being mounted for free rotation on said driven shaft; self-locking worm and worm-gear transmission means operatively connected to one of said bevel gears for rotating the same; reversible worm and worm-gear transmission means operatively connected to the other of said bevel gears for rotating the same; electrical reversible motor means operatively connected to said self-locking transmission means for driving the same; manually operable shaft means operatively connected to said reversible transmission means for operating the same; friction means operatively connected to said reversible transmission means for increasing the force required for reversal thereof, said friction means comprising a plate member mounted on said manually operable shaft means only for sliding movement therealong, a stationary member located in contact with said plate member, and a coil spring member located about said manually operable shaft and urging said plate member against said stationary member so that said plate member will frictionally bear against said stationary member when said manually operable shaft is rotated, said spring member having a force greater than the difference between the force of said motor means tending to drive said reversible transmission means; and the friction force required to reverse the latter cushion means operatively connected to self-locking transmission means for absorbing the inertia of said motor means when the operation of said self-locking transmission means is terminated; safety means operatively connected to said motor means for automatically terminating the operation thereof when a predetermined torque is reached; impact starter means located between said driven shaft and motor means for permitting the latter to rotate before said driven shaft is rotated; and limit switch means operatively connected to said motor for limiting the rotation of said driven shaft in both directions by said motor means.

12. A driving arrangement, comprising in combination, a driven shaft; transmission means operatively connected to said shaft for driving the same, said transmission means including a worm; a driving shaft supporting said worm, said worm being mounted on said driving shaft only for sliding movement thereon so as to rotate with the same; a plurality of spaced first dogs fixedly connected to said driving shaft for rotation therewith; a gear mounted on said driving shaft for free rotation thereabout; a plurality of second dogs fixedly connected to said gear and respectively being at least partially located between said first dogs, each of said second dogs being of a lesser width than the space between two adjacent first dogs so as to provide a plurality of spaces between each first dog and each second dog; a plurality of springs respectively located in said spaces and urging said second dogs in one direction of rotation with respect to said first dogs; motor means operatively connected to said gear for rotating the same in a direction opposite to said one direction of rotation so as to thereby rotate said driving shaft and compress said springs; and a coil spring mounted about said driving shaft and bearing with one end thereof against said worm and with the other end thereof against a stationary member, said coil spring having a greater force than the total force of said plurality of springs located in said spaces, when the driving arrangement is stationary, whereby, when the operation of said transmission means is terminated, the inertia of said motor is absorbed by said coil spring which is compressed by sliding movement of said worm along said driving shaft.

References Cited in the file of this patent

UNITED STATES PATENTS

| | | |
|---|---|---|
| 1,938,720 | Preble | Dec. 12, 1933 |
| 1,996,849 | Bauer | Apr. 9, 1935 |
| 2,005,891 | Elberty | June 25, 1935 |
| 2,028,696 | Beckwith | Jan. 21, 1936 |
| 2,062,905 | Hilty et al. | Dec. 1, 1936 |
| 2,086,030 | Hodgson et al. | July 6, 1937 |
| 2,106,502 | Hawkins | Jan. 25, 1938 |
| 2,210,572 | Durham | Aug. 6, 1940 |
| 2,444,530 | Richards | July 6, 1948 |
| 2,580,298 | Hopkins | Dec. 25, 1951 |
| 2,583,140 | Else | Jan. 22, 1952 |